United States Patent [19]

Friesen et al.

[11] Patent Number: 5,267,780
[45] Date of Patent: Dec. 7, 1993

[54] BOX LATCH AND PROP ROD

[75] Inventors: Henry Friesen, Niagara Falls; Nicholas Hamm, Vineland, both of Canada

[73] Assignee: Deere & Company, Moline, Ill.

[21] Appl. No.: 907,895

[22] Filed: Jul. 2, 1992

[51] Int. Cl.$^5$ .............................................. B60P 1/04
[52] U.S. Cl. .................. 298/17 B; 298/19 R
[58] Field of Search ............... 298/17 B, 19 B, 19 R

[56] References Cited

U.S. PATENT DOCUMENTS 1,635,953  7/1927  Poth ................... 298/19 R
1,797,343  3/1931  Hughes et al. ............. 298/19 R

FOREIGN PATENT DOCUMENTS 754042  8/1956  United Kingdom ............ 298/18

OTHER PUBLICATIONS

Deere & Company, John Deere AMT Transports, 8 pages, 1988, published in U.S.A.
Deere & Company, p. 30-7 from Operator's Manual for John Deere AMT 626, 1 page, Feb., 1990, published in U.S.A.
Deere & Company employees, copy of three pictures of a Kawasaki Mule 2010, 2 pages, Jun., 1992, published in U.S.A.

Primary Examiner—Michael S. Huppert
Assistant Examiner—Janice Krizek

[57] ABSTRACT

A box latch and prop rod is provided for a tiltable cargo box of a utility vehicle. The single rod is fixedly mounted on the vehicle, and slidably movable between a first position where it supports the box in its tilted orientation, and a second position where it locks the box to the vehicle frame for transport or operation. The rod includes a biasing mounting that urges its latching structure towards engagement with a compatible latching structure carried on the vehicle.

8 Claims, 3 Drawing Sheets

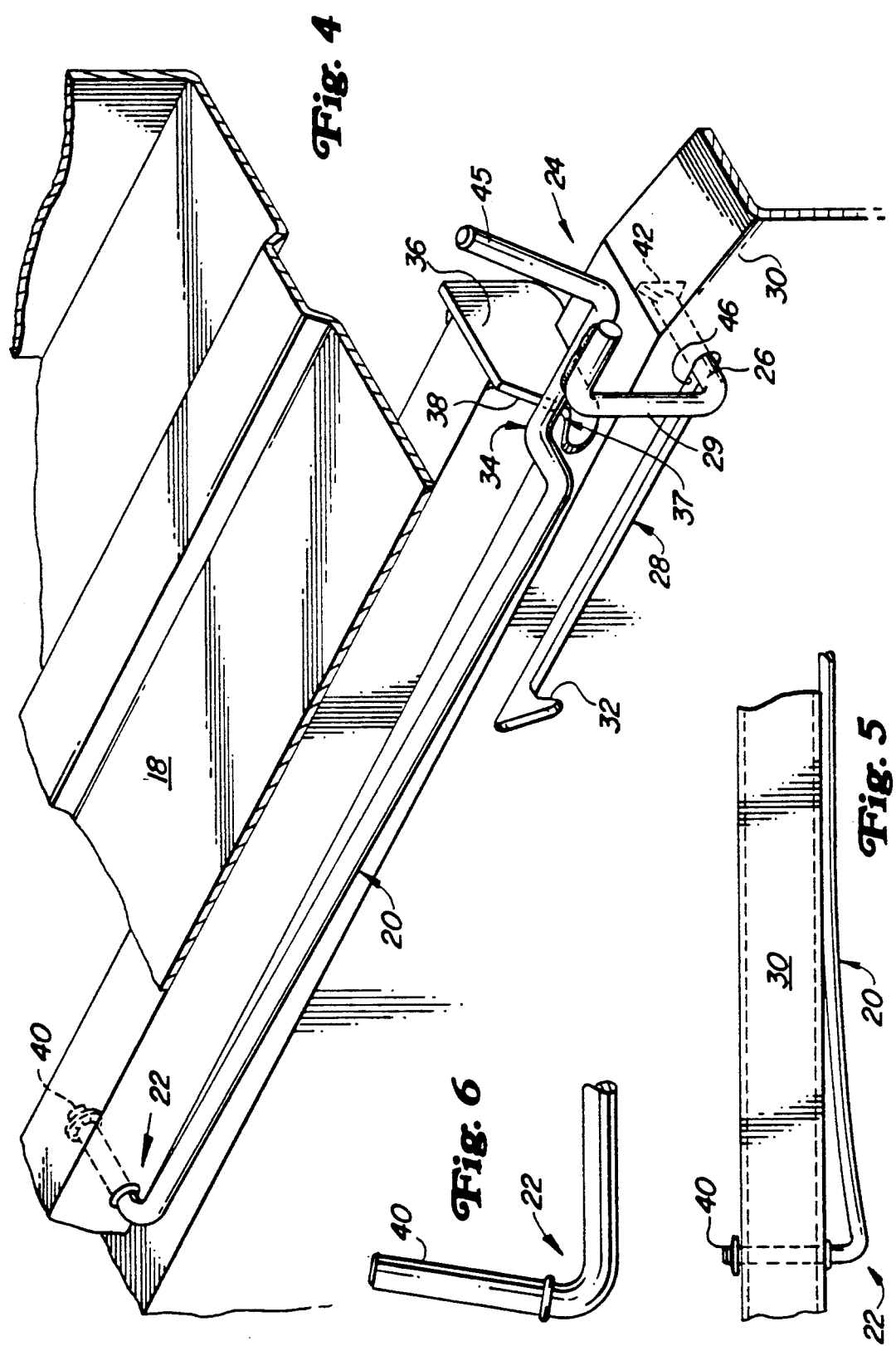

BOX LATCH AND PROP ROD

BACKGROUND OF THE INVENTION

1. Field of the Invention

The present invention relates to utility vehicles and more specifically to a vehicle having a tiltable cargo box with a structure for alternately securing it in either a tilted unloading configuration or in a level transport position.

2. Description of the Prior Art

Utility vehicle having cargo boxes are frequently used to haul various tools and materials. Frequently they are used to haul materials such as dirt, sand or bulk materials that must be unloaded by hand or shovel. Accordingly, they can most easily be unloaded if they can be tilted upwardly to dump the material or allow the operator to scrape the material from the box. These vehicles also have drive and operational components located beneath the cargo boxes, therefore requiring that the box be tilted to allow access for service and/or maintenance.

Present utility vehicles employ various mechanisms to tilt their cargo boxes. One such vehicle utilizes a hydraulic cylinder to tilt the box. A less expensive means relies upon the box being manually tilted and then secured in place with some type of rod support between the box and utility frame.

Not only must the cargo boxes be secured in a tilted orientation, they must be secured in the level or transport position during operation. This need arises to prevent the box from bounding during transport and to prevent the box from swinging or tilting when something is placed on the tailgate section. To secure the cargo box to the vehicle frame, various means, such as bungy cords and over-center latches, are utilized. However, the use of two separate devices for securing the box in its tilted or transport position requires extra manufacture, assembly and maintenance expense.

Therefore, it would be desirable to provide a single, inexpensive means that could be used to quickly and easily secure a cargo box in its elevated position for unloading or, alternately, secure the box in its horizontal working position for transport, thereby eliminating the need for two separate devices and the expense associated therewith.

SUMMARY OF THE INVENTION

There is provided herein a utility vehicle having a tiltable cargo box equipped with a combination box latch and prop rod.

The box latch and prop rod utilizes a rod structure for quickly and easily securing the box in its elevated or tilted position to facilitate unloading, scraping or cleaning of material from the box. Additionally, the rod structure serves to secure the box in its horizontal position during transport and operation.

The rod structure includes a first end portion pivotally carried in the cargo box with the other end portion slidably carried in a slot or track provided in the frame of the utility vehicle. At one end of the track is provided a seat in which the other rod end portion can nest as the box is raised to serve as a brace to support the box in its tilted position.

Additionally coupled to the other end of the rod is a first latch member receivable in a second latch member carried on the box. A built-in bias provided in the rod secures the first latch member above the second latch member or in their engaged position. An angled pivotal mounting connection between the rod and the utility cargo box provides the bias.

To secure the box to the vehicle frame when the first and second latch members are engaged, the arm or leg member which is carried on the rod for sliding movement in the slot of the frame, is coupled to the first latch member. This arm secures the first latch member with the frame when the two latch members are engaged.

If desired, a pair of box latch and prop rods can be provided, one on each side of the utility box. In this manner, each side could be independently supported and secured.

BRIEF DESCRIPTION OF THE DRAWINGS

FIG. 4 illustrates a partial enlarged perspective of the box and rod in their secured transport position.

FIG. 5 shows a partial plan view of the rod, illustrating its spring loaded orientation.

FIG. 6 illustrates a partial plan view of the pivotal end of the rod.

DESCRIPTION OF THE PREFERRED EMBODIMENT

Figure 1:
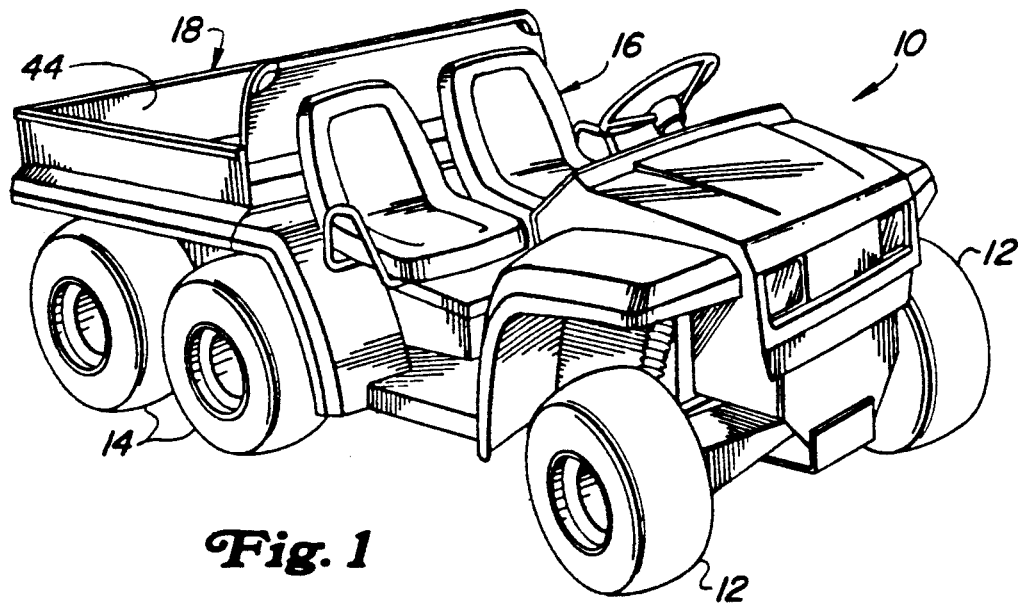
FIG. 1 illustrates an elevated front perspective view of a utility vehicle upon which the invention can be utilized.
Figure 2:
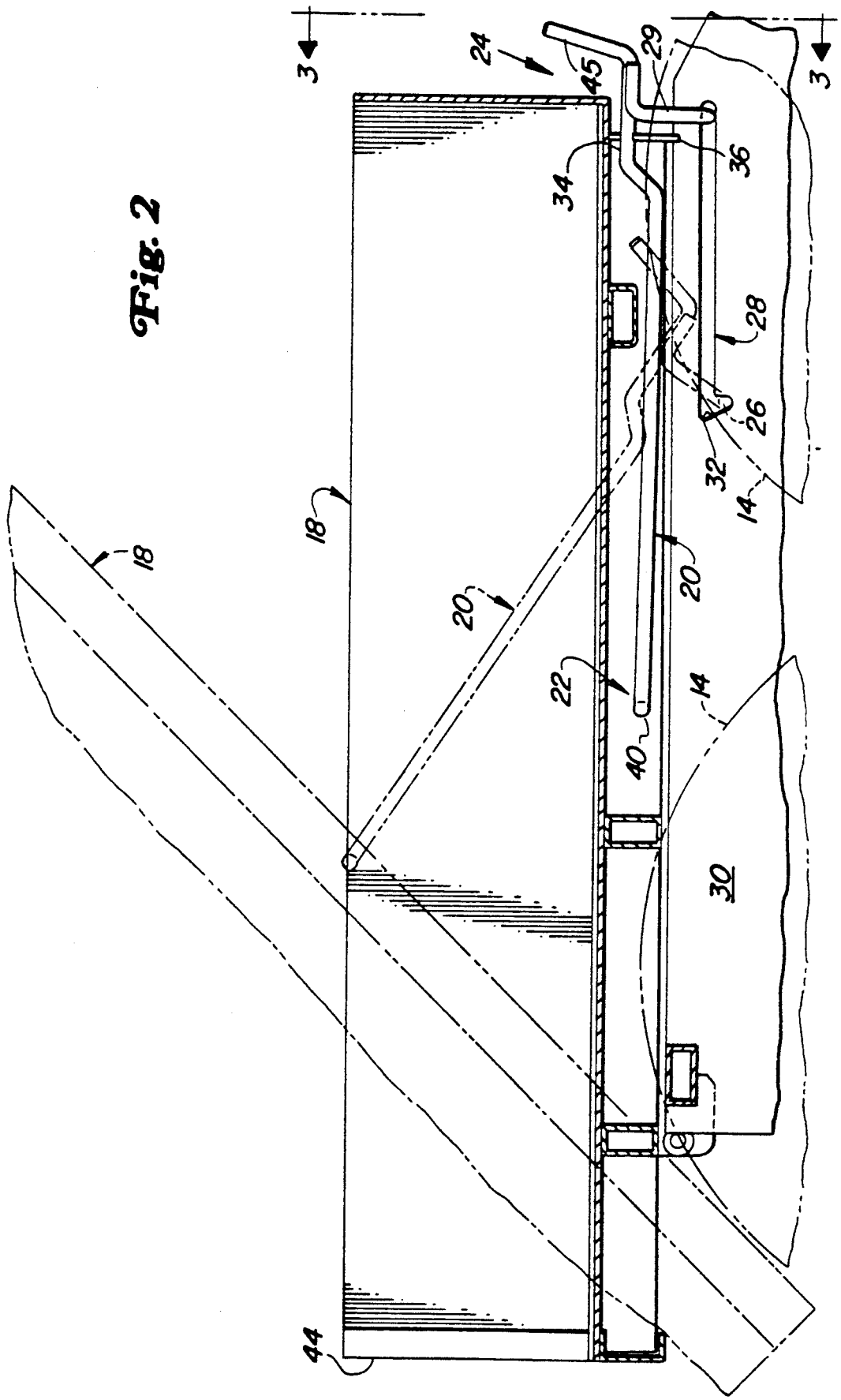
FIG. 2 illustrates a partial enlarged schematic side view of the utility box and rod, the utility box being shown by phantom lines in its raised position.

Looking now to FIG. 1, there is illustrated a utility vehicle 10 having a pair of steerable front wheels 12 and four rear wheels 14. The vehicle 10 includes a pair of seats 16 and a cargo box 18 carried at the rear thereof. The latch and prop rod 20 is carried at the front and inside edge of the cargo box 18, as is illustrated in FIG. 2.

Looking now to FIG. 4, there is illustrated a perspective elevated view of the latch and prop rod 20 in its latched position. The rod 20 includes one end portion 22 which is pivotally received in the cargo box 18, with the other end portion 24 including a leg member or leg means 26 slidably received in a slot or track 28 carried in the frame 30 of the utility vehicle 10. At its rear portion, the slot 28 includes a seat 32 which provides for nesting of the leg member 26 when the rod 20 is moved to the position illustrated in the phantom lines of FIG. 2, the rod 20 then serving as an angled brace between the box 18 and frame 30 to secure the box 18 in its tilted orientation.

Also carried at the front of the rod 20 and slidable within the frame slot 28 is an offset leg member 26 having a portion 29, the leg member 26 being rigidly coupled to a first latch member 34, which in turn is then releasably receivable in a second latch member or latch plate 36 carried on the cargo box 18. This plate 36 includes a jaw 37 having a face 38 against which the first latch member 34 can abut when the first and second latch members 34 and 36 are moved into engagement.

Biasing the rod 20 inwardly and towards the box 18 is the pivotal mounting of the rod 20 with the box 18 (see FIGS. 5 and 6). The short pivot arm 40 that is pivotally secured to the box 18 is formed at an acute angle to the length of the rod 20 and, as illustrated in FIGS. 5 and 6, is mounted generally perpendicularly to the box 18 to provide a biasing force on the rod 20 that urges it towards the frame 30 and cargo box 18.

Carried at the end of the leg member 26 which is received in the track or slot 28 is a stop means 42 provided in the form of a wedge that prevents the leg member 26 from being pulled out of the track 28 when the first latch member 34 on the rod 20 is pulled away from the plate 36 or unlatched from the second latch member 36 on the frame 30.

In operation, the latch and prop rod 20 can be utilized simply and quickly to secure the cargo box in its elevated position by simply sliding the leg member 26 along the track or slot 28 as the box 18 is raised until the leg member 26 reaches the seat 32 and then positioning the leg member or retention means 26 in the seat 32. The angle of force through the rod or elongated support 20 from the box 18 urges the leg member 26 into the seat 32 and secures the box 18 in its tilted or upright position. The first latch member 34 further includes a handle 45 for the operator to grasp the rod 20 and unlatch it to allow the box 18 to be tilted.

Figure 3:
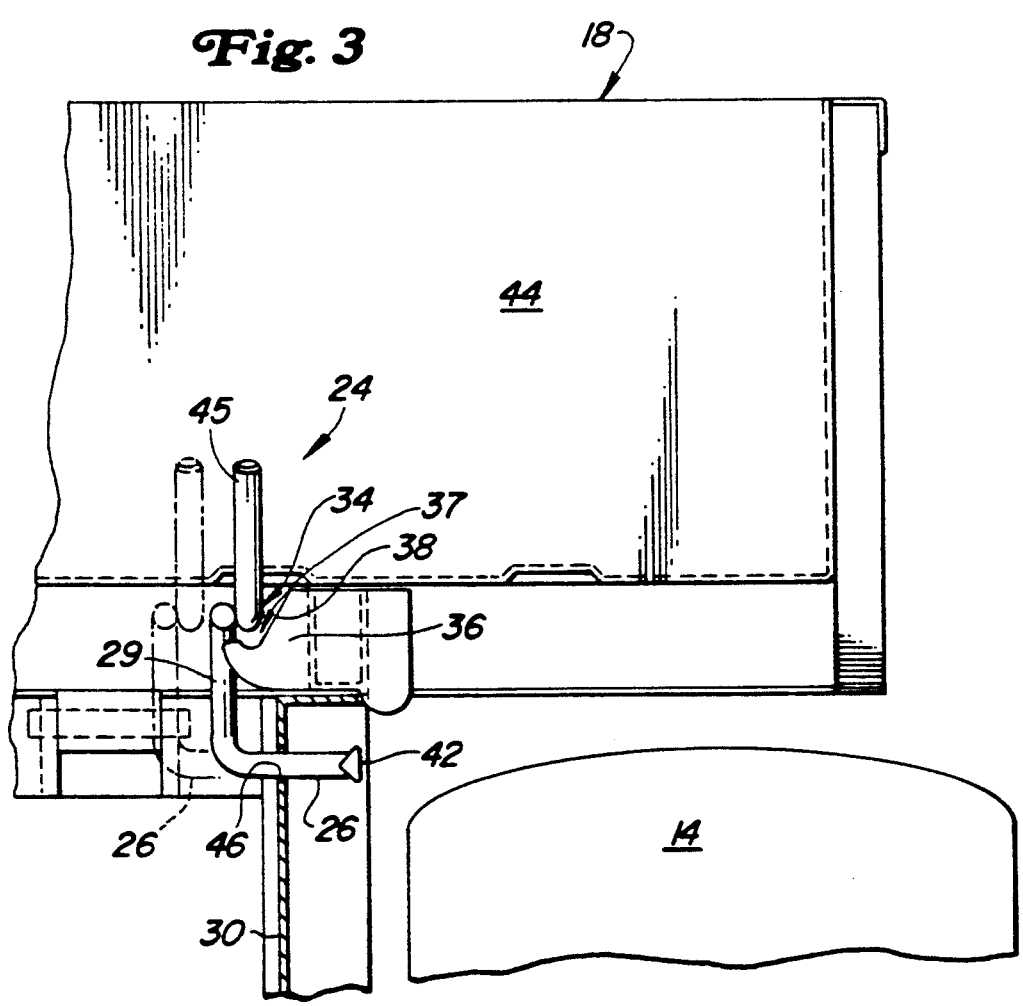
FIG. 3 is a view taken along line 3—3 of FIG. 2 illustrating the end view of the rod and box in their latched transport position.

To secure the box 18 in its level and horizontal operative position with the frame 30 of the vehicle 10, the rod or support 20 is moved to the position illustrated in FIG. 4, as the box 18 is lowered or as illustrated in the solid lines of FIGS. 2 and 3. To move the rod 20, the operator simply moves the leg member 26 out of the seat 32, slides it along the track 28 until it reaches the end portion of the track 28, letting the box 18 down gently to its level position. The first latch member 34, being biased towards the box 18 and second latch member 36, would automatically move into place above the second latch member 36, that is from the phantom to the solid position shown in FIG. 3. Should someone place something on the tailgate 44, the leg member 26 of the rod 20, which is rigidly coupled to the first latch member 34, would be pulled up against the top edge 46 of the track 28, the second latch member 36 would raise to contact the first latch member 34, thereby preventing the box 18 from moving upwardly and also lockably engaging the first and second latch members 34-36.

If preferred, a latch and prop rod 20 can be provided to each side of the cargo box 18 to allow the operator to provide additional support and locking structure for the cargo box 18.

With the present invention, a single means is provided to secure the pivotally tiltable cargo box in either its tilted or its level operating position. This rod is carried on the vehicle, is simple and easy to use, and to move between its two positions. It is simple, easy and inexpensive to manufacture, assemble and maintain, providing a single part for a dual function.

We claim:

1. Means for securing a pivotally tiltable box member carried on the frame member of a vehicle in either a first position generally abutting the frame member or a second position having one end of the box member pivotally swung away from the frame member comprising:
   rod means interconnecting the box and frame members and having one end portion pivotally connected with one of the box and frame members and the other end portion carrying retention means which is slidably received in a track carried by the other of the box and frame members;
   the track having a longitudinal axis and including a seat offset from the longitudinal axis of the track and provided at one end portion thereof with the retention means being receivable in the offset seat to maintain the box member in its second position;
   a first latch member carried on the other end portion of the rod means;
   a second latch member carried on one of the box and frame members and releasably engagable with the first latch member; and
   means biasing the first latch member towards engagement with the second latch member to retain the box member in its first position.

2. The invention defined in claim 1 wherein the biasing means includes a pivotal mounting for one end of the rod means which is adapted to urge the first latch member towards engagement with a jaw carried by the second latch member.

3. The invention defined in claim 1 wherein the retention means includes a leg member slidably receivable in the track.

4. The invention defined in claim 3 wherein an end portion of the leg member is provided with stop means to retain it in the track.

5. The invention defined in claim 1 wherein the rod means has one end portion pivotally received in the box member and the other end portion slidably received in said track carried in the frame member.

6. The invention defined in claim 5 wherein the biasing means includes a pivotal mounting for the one end portion of the rod means which is adapted to urge a shoulder member carried by the other end portion of the rod means towards engagement with a jaw carried by the second latch member.

7. For use with a vehicle having a frame and a cargo box tiltable between a raised and lowered position, an improved means comprising:
   an elongated rod interconnecting the frame and box, the rod having one end portion pivotally connected with the box and the other end portion including leg means slidably received in a slot provided in the frame, the slot having a longitudinal axis and including a seat provided at one end thereof offset from the longitudinal axis of the slot for receiving the leg means;
   a first latch means carried at the other end portion of the rod;
   a second latch means carried on the vehicle for releasable engagement with the first latch means whereby the rod can secure the box in its raised position when the leg means is received in the offset seat or alternately retain the box in its lowered position when the first and second latch means are engaged with each other.

8. For use with a vehicle having a first member rigidly carried thereon and a second member having first and second spaced apart ends, the second member being pivotally coupled to the first member for swinging movement between a first position where its second end is adjacent the first member and a second position where its second end is spaced from the first member, improved means for securing the second member in either its first or second position comprising:
   an elongated support having one end portion pivotally connected with one of the first and second members and a leg member carried on its other end portion, said leg member receivable in a slot having a longitudinal axis, said slot being provided in the other of said first and second members, said leg member slidable along the slot for movement into and out of a seat offset from the longitudinal axis of the slot and provided at one end of the slot; a first latch means carried on the other end portion of the support in spaced apart relation to and operatively connected with the leg member;

a second latch means carried on the vehicle for releasably engaging the first latch means whereby the elongated support secures the second member in its second position when the leg member is in the seat or retains the second member in its first position when the leg member is disengaged from the seat and the first and second latch means are engaged with each other.

* * * * *